United States Patent
Song

(10) Patent No.: US 6,862,043 B1
(45) Date of Patent: Mar. 1, 2005

(54) DEVICE FOR CONVERTING VIDEO FORMAT

(75) Inventor: Chi Hyung Song, Seoul (KR)

(73) Assignee: LG Electronics Inc., Seoul (KR)

( * ) Notice: Subject to any disclaimer, the term of this patent is extended or adjusted under 35 U.S.C. 154(b) by 363 days.

(21) Appl. No.: 09/241,413

(22) Filed: Feb. 2, 1999

(30) Foreign Application Priority Data

Feb. 3, 1998 (KR) .............................................. 98-2940

(51) Int. Cl.$^7$ .............................................. H04N 7/01
(52) U.S. Cl. ....................... 348/441; 348/458; 348/581
(58) Field of Search ................................. 348/441, 458, 348/449, 558, 445, 581

(56) References Cited

U.S. PATENT DOCUMENTS

| | | | | |
|---|---|---|---|---|
| 4,872,054 A | * | 10/1989 | Gray et al. ................... 348/441 |
| 5,008,752 A | * | 4/1991 | Van Nostrand ............. 348/581 |
| 5,099,327 A | * | 3/1992 | Murakoshi ................... 348/458 |
| 5,159,438 A | * | 10/1992 | Rabii .......................... 348/441 |
| 5,404,169 A | * | 4/1995 | Bae ............................. 348/443 |
| 5,444,491 A | * | 8/1995 | Lim ............................ 348/441 |
| 5,532,716 A | * | 7/1996 | Sano ........................... 345/698 |
| 5,677,738 A | * | 10/1997 | Mizutani et al. ............ 348/458 |
| 5,739,867 A | * | 4/1998 | Eglit .......................... 348/581 |
| 5,844,541 A | * | 12/1998 | Cahill, III ................... 345/667 |
| 5,914,753 A | * | 6/1999 | Donovan .................... 348/441 |
| 5,943,097 A | * | 8/1999 | Horii .......................... 348/441 |
| 5,999,164 A | * | 12/1999 | Ito .............................. 345/603 |

* cited by examiner

Primary Examiner—Victor R. Kostak
(74) Attorney, Agent, or Firm—Birch, Stewart, Kolasch & Birch, LLP

(57) ABSTRACT

Device for converting a video format including a control unit for determining an operation conducted at the present time, recognizing an operation to be conducted at the next time based on the operation conducted at the present time, and providing control signals suitable for the operation to be conducted at the next time, according to an input video format of an input video signal and an output video format of an output video signal desired to provide, and a processing unit for conducting operations required for converting the input video format into the output video format desired to provide in response to the control signals form the control unit, thereby requiring very simple modification of hardware for being adoptive to an addition of a new format and facilitating display of a variety of modes the user requires.

24 Claims, 10 Drawing Sheets

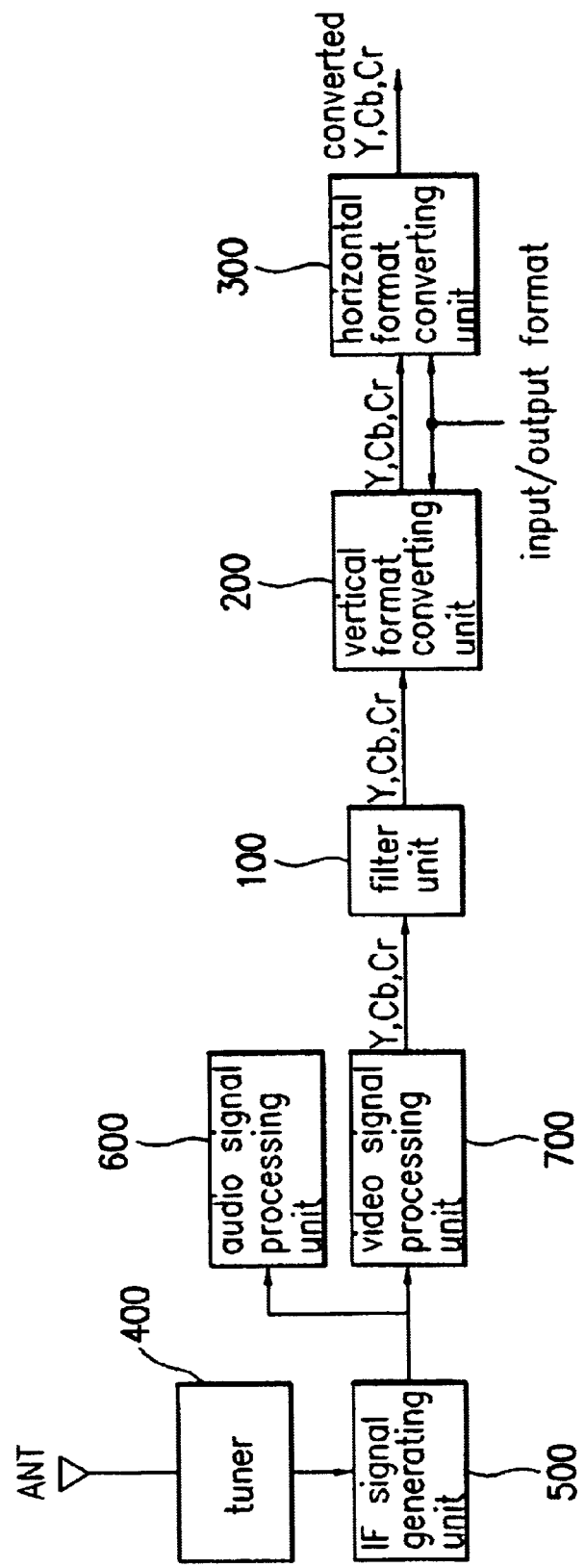

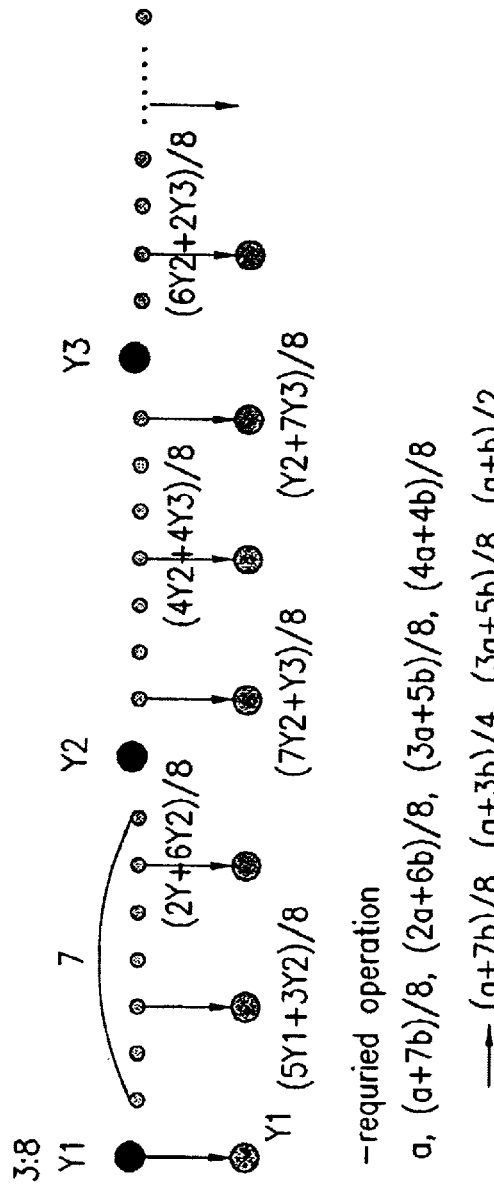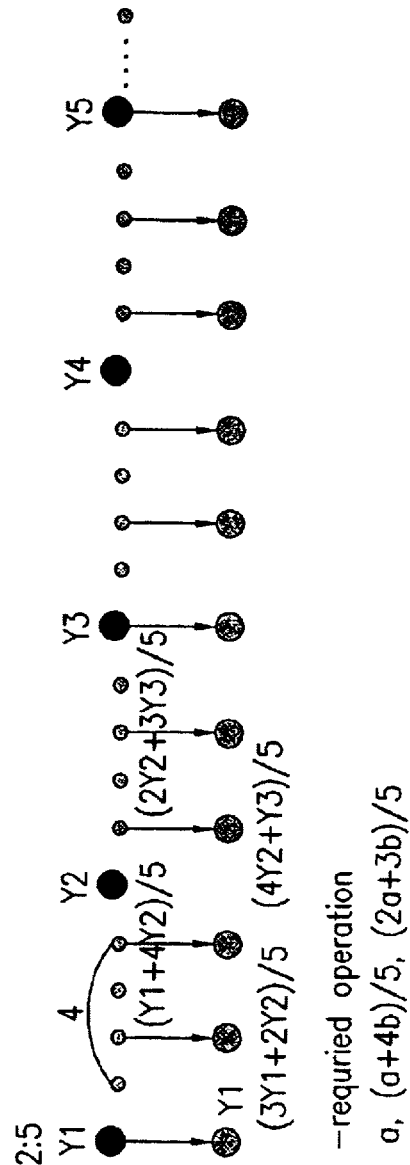

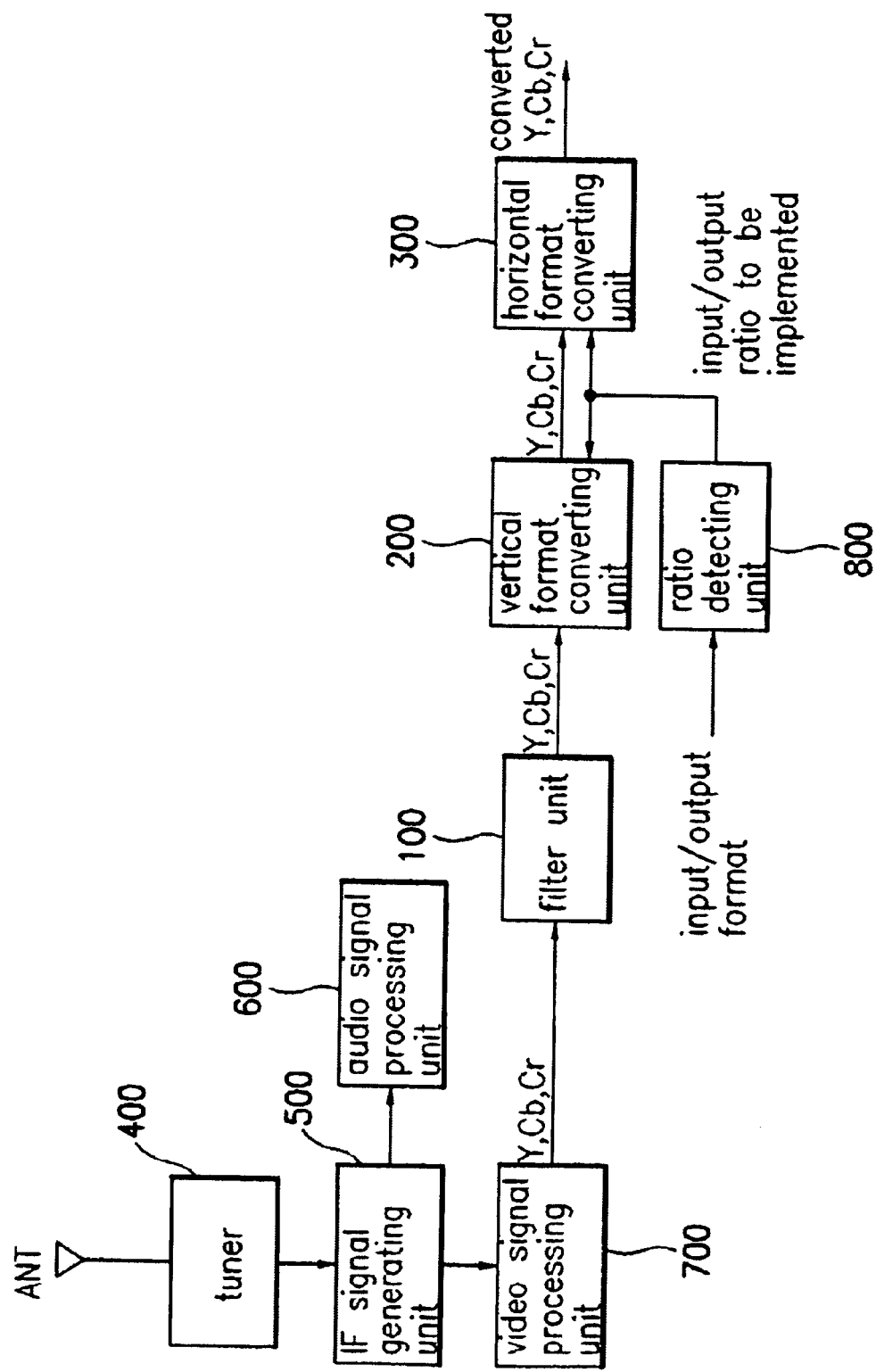

DEVICE FOR CONVERTING VIDEO FORMAT

BACKGROUND OF THE INVENTION

1. Field of the Invention

The present invention relates to a device for converting a video format in a digital television receiver.

2. Background of the Related Art

The digital TV receiver should be capable of processing, and providing videos of different formats, to require a device for converting an input video format into an output video format. As shown in FIG. 1, a related art device for converting a video format is provided with a vertical interpolation unit 11 having a plurality of vertical N:M interpolators 11a, 11b, 11c, —, connected in parallel, a horizontal interpolation unit 12 having a plurality of horizontal N:M interpolators 12a, 12b, 12c, 12d, - - - , connected in parallel, and a multiplexer 13. For example, if a received video format is "720×1280", the vertical 2:3 interpolator 11a and the horizontal 2:3 interpolator 12a subject the received video format to interpolation, to provide a converted video format of "1080×1920" through the multiplexer 13. And, if the received video format is "480×720", the vertical 2:3 interpolator 11b and the horizontal 3:8 interpolator 12b subject the received video format to interpolation, to provide a converted video format of "1080×1920" through the multiplexer 13. In other word, the related art device requires many vertical N:M interpolators and many horizontal N:M interpolators depending on a number of received video formats. Thus, since the related art device requires new interpolators every time a new input format is added, the related art device has a disadvantage of having a large size And, the related art device has a disadvantage that a modification of a circuit for adoption of the new input or output video is not easy. In order to overcome the foregoing disadvantage, as shown in FIG. 2, U.S. Pat. No. 5,528,301 teaches use of 3 filters 21. That is, a decimation filter in FIG. 2 decimates a received video format at a coefficient for each aspect ratio of received video formal. Then, a band limiting filter 22 limits a frequency band, and, finally, an interpolation filter 23 filters the limited video signal, to provide a low frequency band only and to provide a desired video format. However, the use of three filters is costly and results in a large circuit. And, because the determination of filter tap coefficients is complicated, the design is not easy.

SUMMARY OF THE INVENTION

Accordingly, the present invention is directed to a device for converting a video format in a digital television receiver that substantially obviates one or more of the problems due to limitations and disadvantages of the related art.

An object of the present invention is to provide a device for converting a video format in a digital television receiver, which can be realized with a small sized hardware and applicable to a new format with easy.

Another object of the present invention is to provide a low cost device for converting a video format in a digital television receiver.

Another object of the present invention is to provide a digital TV receiver having a low cost device for converting a video format.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for converting a video format includes a control unit for determining a conversion operation to be conducted at a time point according to an input video format of an input video signal and an output video format of an output video signal desired to provide, and providing control signals suitable for the operation to be conducted at the time point. A processing unit conducts operations required for converting the input video format into the output video format desired to provide in response to the control signals form the control unit. The processing unit has a first processing unit and a second processing unit. The first processing unit includes a delay for delaying a received luminance signal, an operand mapping unit for utilizing the delayed luminance signal from the delay and a luminance signal received presently in determining initial operands to be used in a conversion operation equation, i.e., a first value 'a' and a second value 'b', according to a format conversion ratio, a numerator generating unit for generating a numerator in the conversion operation equation using the operands of the conversion operation equation from the operand mapping unit, and a denominator generating unit for selecting a denominator of the conversion operation equation, dividing the numerator of the conversion operation equation from the numerator generating unit with the selected denominator, to obtain a converted luminance signal. The second processing unit includes a delay for delaying a chrominance signal, an averaging unit for averaging a chrominance signal Cn-1 received presently and the chrominance signal delayed in the delay, a first multiplexer for selectively providing either one of the chrominance signal received presently and a value from the averaging unit under the control of the control unit, a second multiplexer for selectively providing either one of the chrominance signal Cn delayed in the delay and a value from the averaging unit under the control of the control unit, an operand mapping unit for utilizing the delayed luminance signal from the delay and a luminance signal received presently in determining initial operands to be used in a conversion operation equation, i.e., a first value 'a' and a second value 'b', according to a format conversion ratio, a numerator generating unit for generating a numerator in the conversion operation equation using the operands of the conversion operation equation from the operand mapping unit, and a denominator generating unit for selecting a denominator of the conversion operation equation, dividing the numerator of the conversion operation equation from the numerator generating unit with the selected denominator, to obtain a converted luminance signal.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 3A illustrates a block diagram showing a device for converting a video format in accordance with a preferred embodiment of the present invention.

FIGS. 8A and 8B illustrate diagrams each for explaining a process for converting a luminance signal in a horizontal direction;

DETAILED DESCRIPTION OF THE PREFERRED EMBODIMENT

Reference will now be made in detail to the preferred embodiments of the present invention, examples of which are illustrated in the accompanying drawings. FIG. 3A illustrates a block diagram showing a system of a device for converting a video format in accordance with a preferred embodiment of the present invention, schematically.

Figure 1:
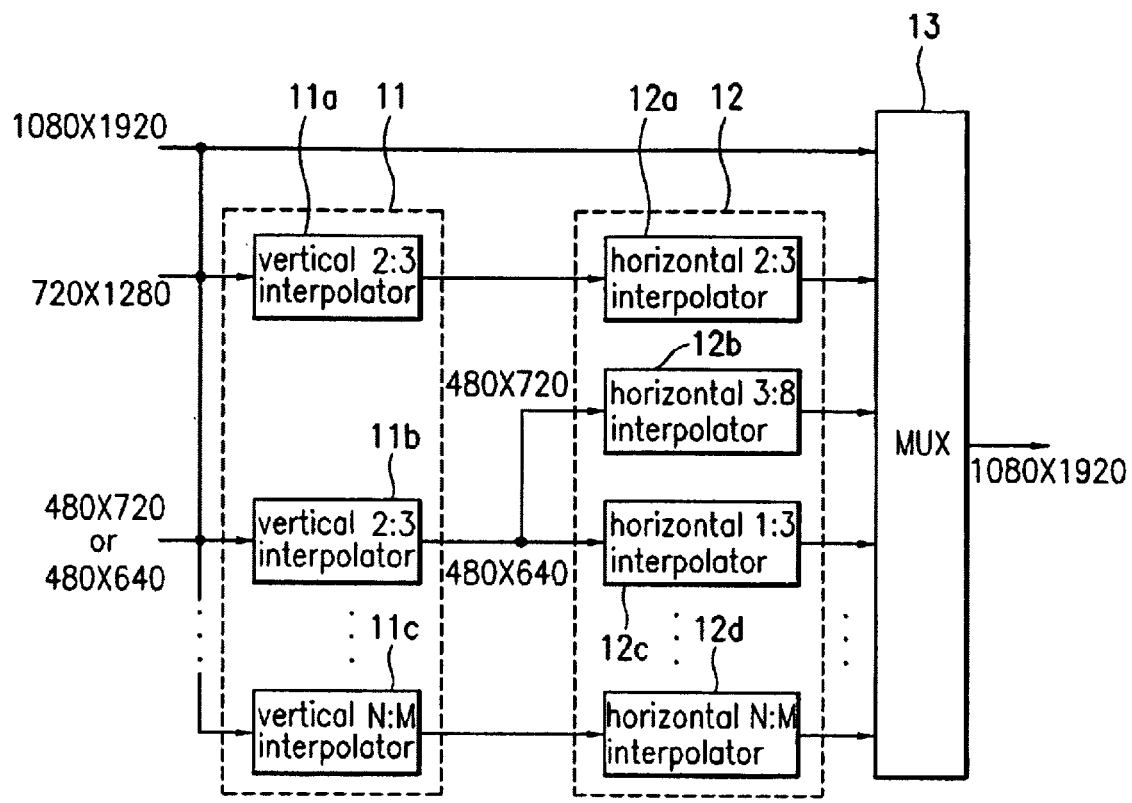
FIG. 1 illustrates a block diagram showing one related art device for converting a video format.
Figure 2:
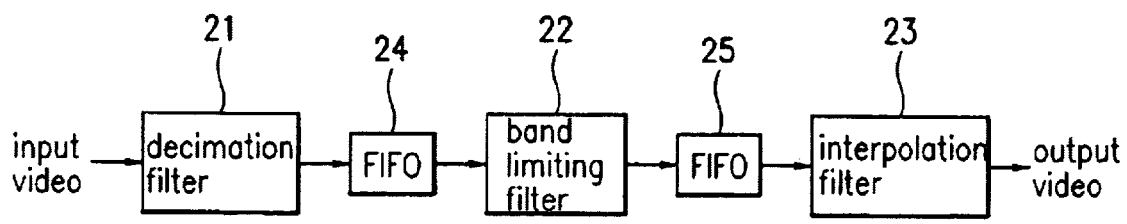
FIG. 2 illustrates a block diagram showing another related art device for converting a video format.
Figure 3B:
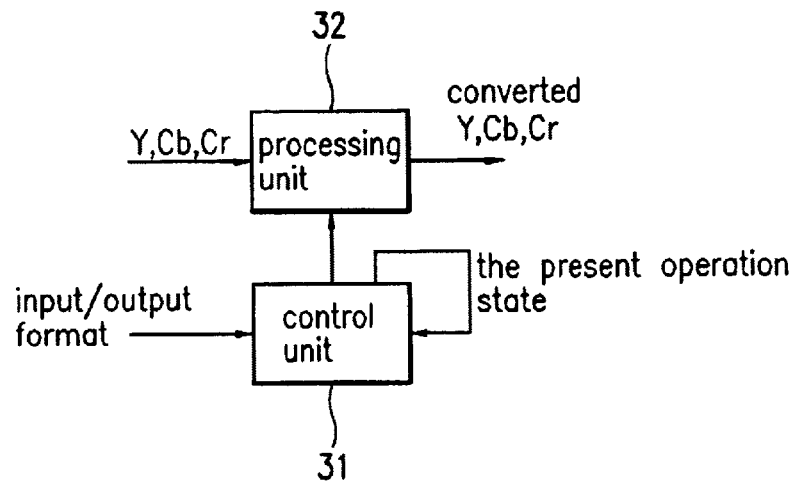
FIG. 3B illustrates a block diagram showing the vertical and horizontal format converting units of the device shown in FIG. 3A.
Figure 3C:
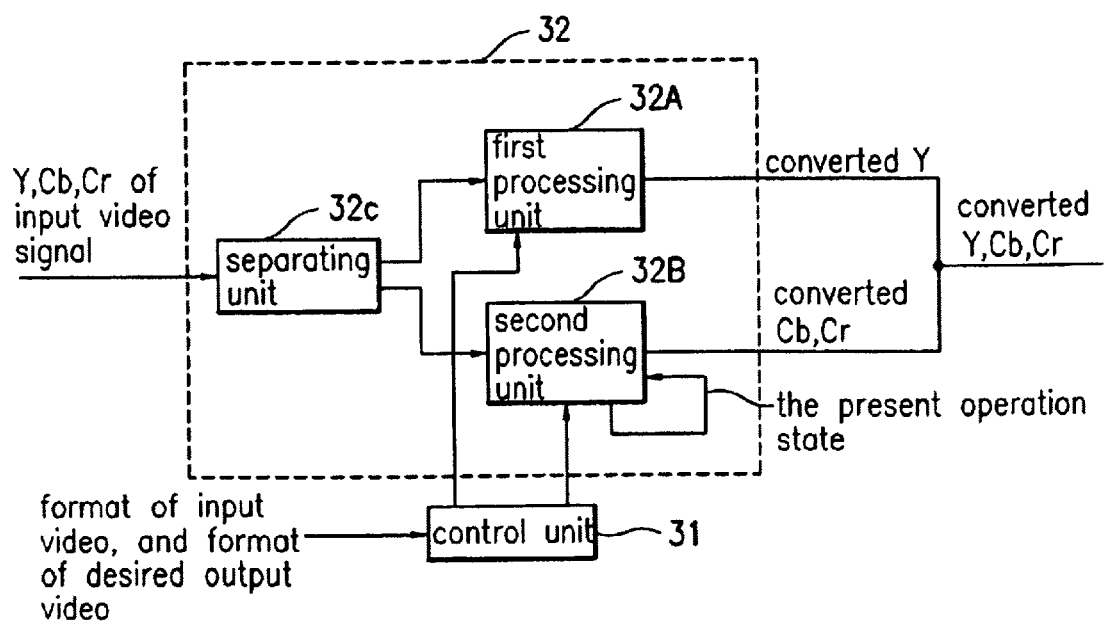
FIG. 3C illustrates a block diagram showing detail of FIG. 3B.

Referring to FIG. 3A, an input video signal is low pass filtered through a filter unit 100 and has its format converted in vertical, and horizontal directions to match to a desired output format through a vertical format converting unit 200 and a horizontal format converting unit 300. In FIG. 3A, reference numeral 400 denotes a tuner for synchronizing to a signal of a desired channel, 500 denotes an intermediate frequency(IF) signal generating unit for generating an intermediate frequency signal of the synchronized channel signal, 600 denotes an audio signal processing unit for processing the intermediate frequency signal such that only an audio signal in the intermediate frequency signal is audible, and 700 denotes a video signal processing unit for processing a video signal in the intermediate frequency signal for obtaining a chrominance signal and a luminance signal. In FIG. 3A, Y denotes a luminance signal in the video signal, and Cb and Cr denote chrominance signals. Each of the vertical format converting unit 200 and the horizontal format converting unit 300 shown in FIG. 3A has a system as shown in FIG. 3B. That is, FIG. 3B illustrates a detailed block diagram of the vertical format converting unit 200 or the horizontal format converting unit 300. FIG. 3B shows a control unit 31 and a processing unit 32, for making an operation to obtain a desired output video format. The control unit 31 determines an operation which should be conducted at a next time based on an operation conducted presently according to an input video format and an output video format, and controls the processing unit 32 for making the operation which should be conducted at the next time. That is, the control unit 31 provides a linear interpolation equation for converting input format into output format according to the input video format and the output video format and an operation equation required for the format conversion using a symmetry of the linear interpolation equation to the processing unit 32, and the processing unit 32 conducts the operation. FIG. 3C illustrates a block diagram a detailed system of FIG. 3B. In FIG. 3C, the processing unit 32 in FIG. 3B includes a first processing unit 32A for converting a luminance signal Y format in a received video signal to a desired format, a second processing unit 32B for converting chrominance signal Cb and Cr formats in the received video signal into desired formats, and a separating unit 32c for separating the received video signal into chrominance signals Cb and Cr and a luminance signal Y.

Figure 4:
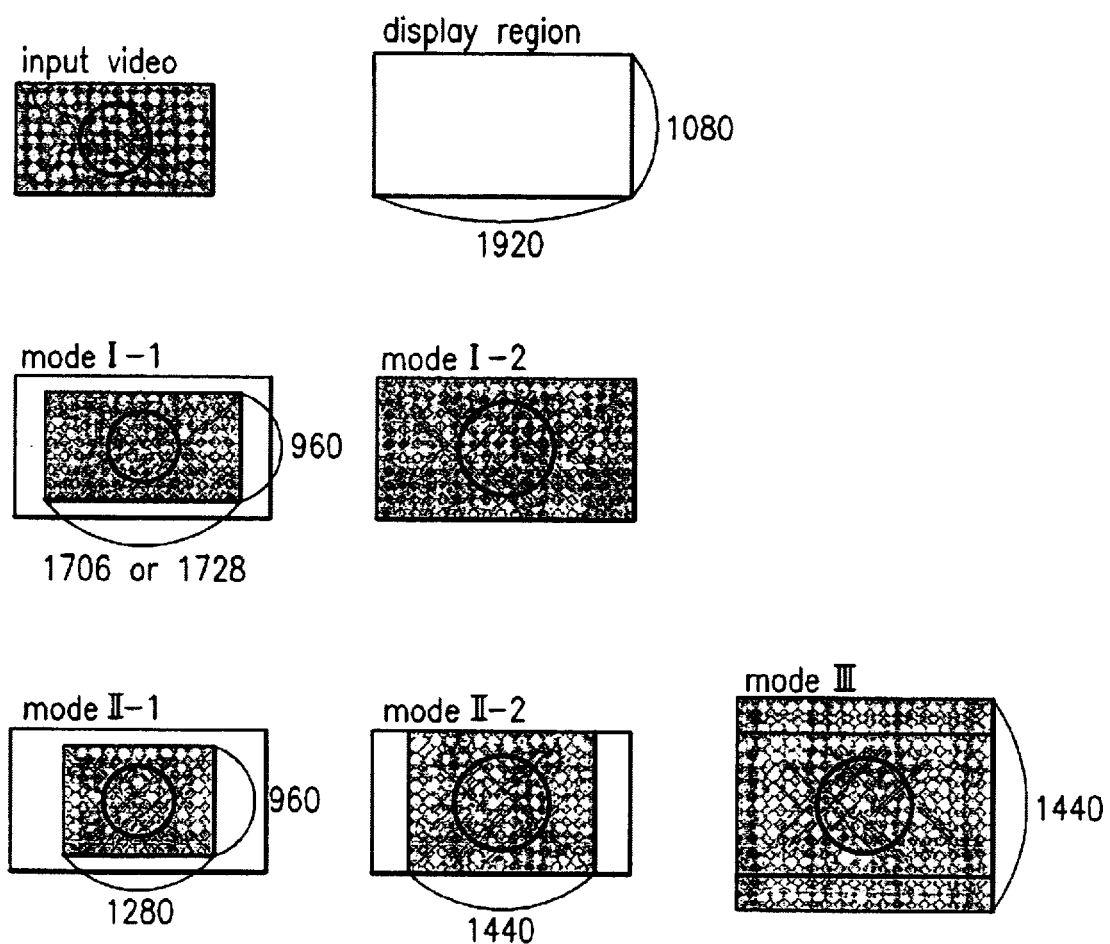
FIG. 4 illustrates a diagram for explaining different display modes of a digital TV receiver.

FIG. 4 illustrates a diagram for explaining different display modes of a digital TV receiver, wherein 5 modes of conversion of a received video format with an aspect ratio of 16:9 or 4:3 into a display video format with an aspect ratio of 16:9 are shown. The five modes are mode I-1, mode I-2, mode II-1, mode II-2 and mode III. Tables 1, 2, and 3 show relations between input video formats and output video formats in a digital TV receiver.

TABLE 1

| Input | Output | Mode | V(verti.) ratio | H(horiz.) ratio |
|---|---|---|---|---|
| 1080 × 1920, 16:9 | 540 × 1920, 16:9 | mode I-2 | 1:1(540) | 1:1(1920) |
| 540 × 1920, 16:9 | 540 × 1920, 16:9 | zoom | 1:2(1080) | 1:2(3840) |
| 720 × 1280, 16:9 | 540 × 1920, 16:9 | mode I-2 | 4:3(540) | 2:3(1920) |
|  | 540 × 1920, 16:9 | zoom | 2:3(1080) | 1:3(3840) |
| 480 × 720, 16:9 | 480 × 1728, 16:9 | mode I-1 | 1:1(480) | 5:12(1728) |
|  | 540 × 1920, 16:9 | mode I-2 | 8:9(540) | 3:8(1920) |
| 240 × 720, 16:9 | 480 × 1728, 16:9 | mode I-1 | 1:2(480)-De | 5:12(1728) |
| 480 × 720, 4:3 | 480 × 1728, 16:9 | mode I-1 | 1:1(480) | 5:12(1728) |
|  | 540 × 1920, 16:9 | mode I-2 | 8:9(540) | 3:8(1920) |
|  | 540 × 1280, 4:3 | mode II-1 | 1:1(480) | 9:16(1280) |
|  | 540 × 1440, 4:3 | mode II-2 | 8:9(540) | 1:2(1440) |
|  | 540 × 1920, 4:3 | mode III | 2:3(720) | 3:8(1920) |

TABLE 2

| Input | Output | Mode | V(verti.) ratio | H(horiz.) ratio |
|---|---|---|---|---|
| 240 × 720, 4:3 | 480 × 1728, 16:9 | mode I-1 | 1:2(480)-De | 5:12(1728) |
|  | 480 × 1280, 4:3 | mode II-1 | 1:2(480)-De | 9:16(1280) |
|  | 540 × 1920, 4:3 | mode III | 1:3(720)-De | 3:8(1920) |

TABLE 2-continued

| Input | Output | Mode | V(verti.) ratio | H(horiz.) ratio |
|---|---|---|---|---|
| 480 × 640, 4:3 | 480 × 1706, 16:9 | mode I-1 | 1:1(480) | 3:8(1706) |
| | 540 × 1920, 16:9 | mode I-2 | 8:9(540) | 1:3(1920) |
| | 480 × 1280, 4:3 | mode II-1 | 1:1(480) | 1:2(1280) |
| | 540 × 1440, 4:3 | mode II-2 | 8:9(540) | 4:9(1440) |
| | 540 × 1920, 4:3 | mode III | 2:3(720) | 1:3(1920) |
| 240 × 640, 4:3 | 480 × 1706, 16:9 | mode I-1 | 1:2(480)-De | 3:8(1706) |
| | 480 × 1280, 4:3 | mode II-1 | 1:2(480)-De | 1:2(1280) |
| | 540 × 1920, 4:3 | mode III | 1:3(720)-De | 1:3(1920) |
| 768 × 1240, 4:3 | 540 × 1489, 4:3 | mode II-2 | 17:12(542)-De | 11:16(1489) |

TABLE 3

| Input | Output | Mode | V(verti.) ratio | H(horiz.) ratio |
|---|---|---|---|---|
| 480 × 768, 4:3 | 480 × 1728, 16:9 | mode I-1 | 1:1(480) | 4:9(1728) |
| | 540 × 1920, 16:9 | mode I-2 | 8:9(540) | 2:5(19280) |
| | 480 × 1280, 4:3 | mode II-1 | 1:1(480) | 3:5(1280) |
| | 540 × 1440, 4:3 | mode II-2 | 8:9(540) | 8:15(1440) |
| | 540 × 1920, 4:3 | mode III | 2:3(720) | 2:5(1920) |
| 240 × 768, 4:3 | 480 × 1728, 16:9 | mode I-1 | 1:2(480)-De | 4:9(1728) |
| | 480 × 1280, 4:3 | mode II-1 | 1:2(480)-De | 3:5(1280) |
| | 540 × 1920, 4:3 | mode III | 1:3(720)-De | 2:5(1920) |

In tables 1, 2, and 3, modes I denote cases when an output format has an aspect ratio of 16:9, and modes II and modes III are cases when a format has an aspect ratio of 4:3. The "De" in the vertical ratio column in tables 1, 2, and 3 denotes that a de-interlacing is conducted, in which an interlaced scanning video is converted into a progressive scanning video.

Figure 5:
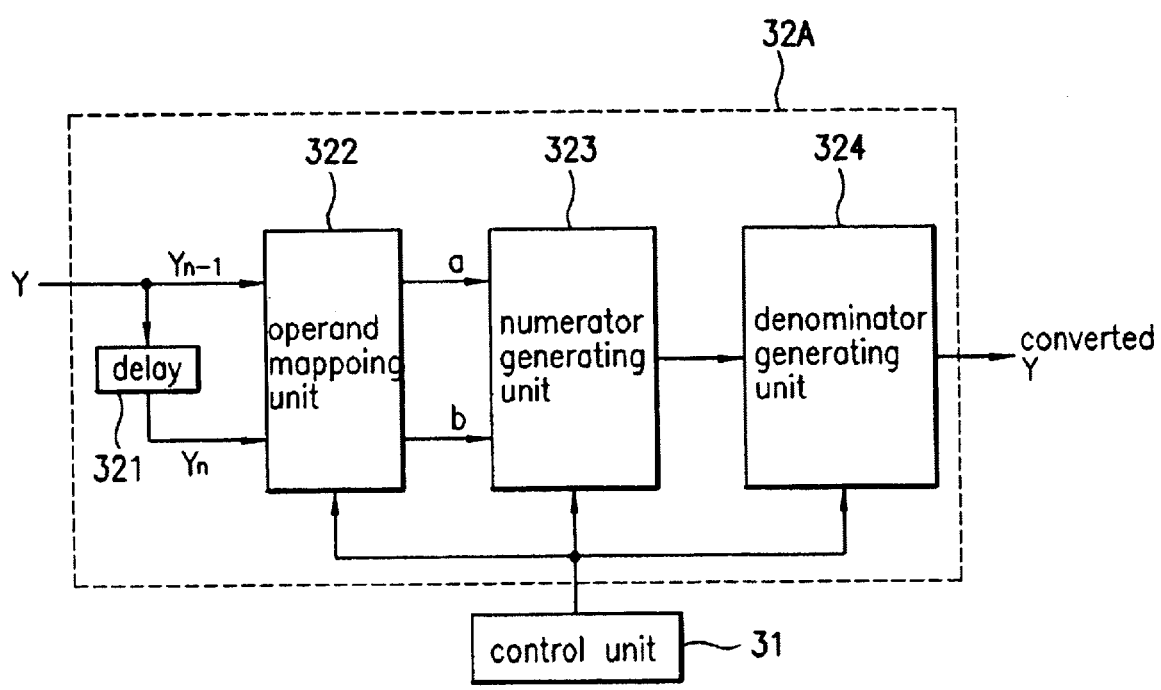
FIG. 5 illustrates a block diagram showing a system of the first processing unit in FIG. 3C.

Details of the first processing unit 32A and the second processing unit 32B both shown in FIG. 3C will be explained. FIG. 5 illustrates a block diagram showing a system of the first processing unit 32A in FIG. 3C.

Referring to FIG. 5, the first processing unit 32A includes a delay 321 for delaying a received luminance signal, an operand mapping unit 322 for utilizing the delayed luminance signal Yn from the delay 321 and a luminance signal Yn-1 received presently in determining initial operands to be used in a conversion operation equation, i.e., a first value 'a' and a second value 'b', according to a format conversion ratio, a numerator generating unit 323 for generating a numerator in the conversion operation equation using the operands of the conversion operation equation from the operand mapping unit 322, and a denominator generating unit 324 for selecting a denominator of the conversion operation equation, dividing the numerator of the conversion operation equation from the numerator generating unit 323 with the selected denominator, to obtain a converted luminance signal. The control unit 31 recognizes the conversion operation equation which should be executed according to the input/output video formats and controls the operand mapping unit 322, the numerator generating unit 323, and the denominator generating unit 324, such that the operand mapping unit 322, the numerator generating unit 323, and the denominator generating unit 324 conduct the conversion operation equation.

Figure 6:
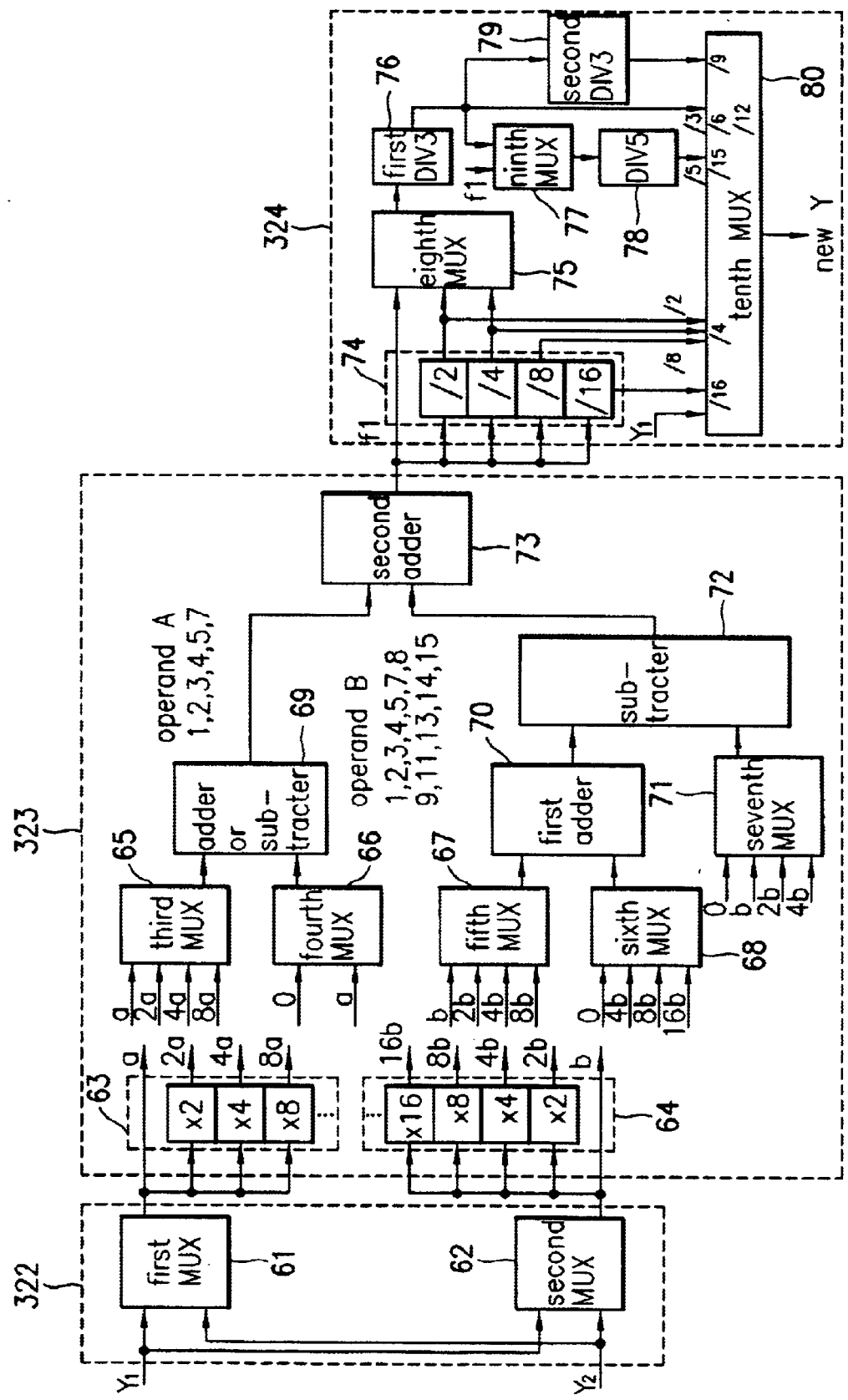
FIG. 6 illustrates a detailed system of FIG. 5.

FIG. 6 illustrates a block diagram showing a detailed system of the first processing unit 32A in FIG. 5.

Referring to FIG. 5, the operand mapping unit 322 includes a first multiplexer 61 for providing a first value 'a', an initial operand, of the conversion operation equation according to a format conversion using the delayed luminance signal Y1 from the delay 321 and a luminance signal Y2 received presently, and a second multiplexer 62 for providing a second value 'b', an initial operand, of the conversion operation equation according to a format conversion using the delayed luminance signal Y1 from the delay 321 and a luminance signal Y2 received presently. The numerator generating unit 323 includes a first shift left 63 for shifting the first value 'a' from the first multiplexer 61 to a left direction by units of an (n)th power of $2(2^n, n=0, 1, 2, ---)$, to provide a plurality of values (a, 2a, 4a, 8a, ---) from the first value 'a', a second shift left 64 for shifting the second value 'b' from the second multiplexer 62 to a left direction by units of an (n)th power of $2(2^n, n=0, 1, 2, ---)$, to provide a plurality of values (b, 2b, 4b, 8b, ----) from the second value 'b', a third multiplexer 65 for receiving the values a, 2a, 4a, 8a, --- from the first shift left 63 and selecting and forwarding one of the values under the control of the control unit 31, a fourth multiplexer 66 for selectively providing either one of "a" and "0" from the first shift left 63 under the control of the control unit 31, a fifth multiplexer 67 for selectively providing either one of values b, 2b, 4b, and 8b from the second shift left 64 under the control of the control unit 31, a sixth multiplexer 68 for receiving the values 4b, 8b, and 16b from the second shift left 64 and "0" and selectively providing any one of the received ones under the control of the control unit 31, a seventh multiplexer 71 for receiving the values b, 2b, and 4b from the second shift left 64 and "0" and selectively providing any one of the received ones under the control of the control unit 31, an operator 69 for subjecting a value from the third multiplexer 65 and a value from the fourth multiplexer 66 to operation (addition or subtraction), a first adder 70 for adding values from the fifth multiplexer 67 and the sixth multiplexer 68, a subtracter 72 for subtracting a value from the seventh multiplexer 71 from a value from the first adder 70, and a second adder 73 for adding values from the operator 69 and the subtracter 72, to generate a numerator f1 of the conversion operation equation. The denominator generating unit 324 includes a shift right 74 for shifting the numerator ft from the numerator generating unit 323 to a right direction by units of (n)th power of $2(2^n, n=0, 1, 2, 3, ---)$ to provide a plurality of values ½, ¼, ⅛, ¹⁄₁₆, ----, (n=0, 1, 2, 3, ---), an eighth multiplexer 75 for receiving the values f1, f½, and f¼ from the shift right 74 and providing any one of the values under the control of the control unit 31, a divider 76 for dividing a value from the eighth multiplexer 75 by three, a ninth multiplexer 77 for selectively providing either one of a value f1 from the numerator generating unit 323 and the value from the first divider 76, a second divider 78 for dividing a value from the ninth multiplexer 77 by "five", a third divider 79 for dividing a value from the first divider 76 by "three", and a tenth multiplexer 80 for selectively providing one of values from the first, second, and third dividers 76, 78, and 79, a luminance signal Y2 received presently, and a value from the shift right 74 as a converted luminance signal under the control of the control unit 31. A detailed system as shown in FIG. 6 may be varied as a designer intends.

Figure 7:
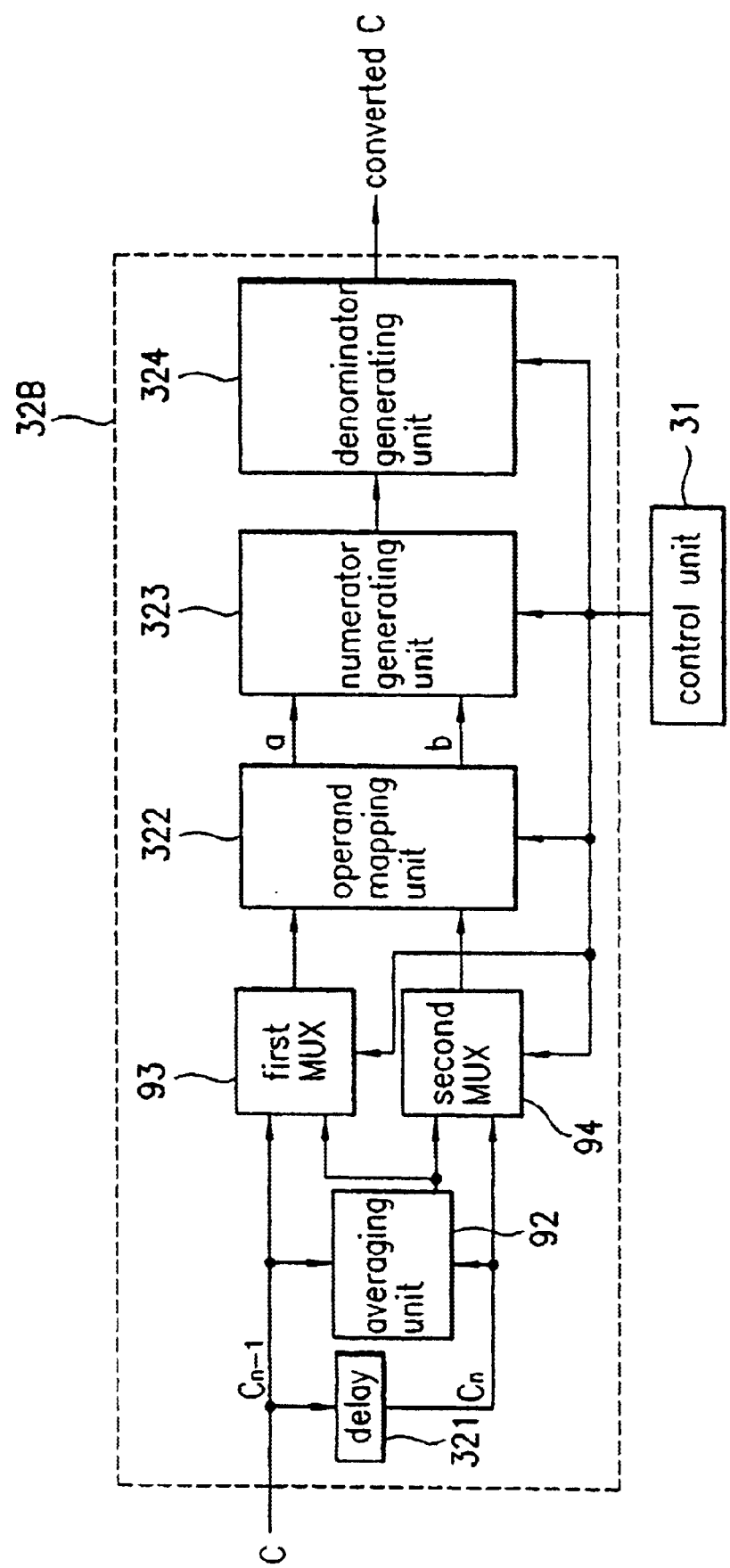
FIG. 7 illustrates a block diagram showing a system of the second processing unit in FIG. 3C.

FIG. 7 illustrates a block diagram showing a system of the second processing unit 32B in FIG. 3C.

Referring to FIG. 7, the second processing unit 32B includes an averaging unit 92 for averaging a chrominance signal Cn-1 received presently and a chrominance signal delayed in the delay 91, a first multiplexer 93 for selectively providing either one of the chrominance signal Cn-1 received presently and a value from the averaging unit 92 under the control of the control unit 31, and a second multiplexer 94 for selectively providing either one of the chrominance signal Cn delayed in the delay 91 and a value from the averaging unit 92 under the control of the control unit 31, in addition to the first processing unit 32A shown in FIG. 5. Others in FIG. 7, such as the operand mapping unit 322, the numerator generating unit 323, and the denominator generating unit 324 are identical to those in FIG. 5 in all aspects, which shows a device for a luminance signal format conversion. The control unit 31 in FIG. 7 is also identical to the control unit 31 in FIG. 5 in all aspects. That is, control signals from the control unit 31 also are shared with the first processing unit 32A for luminance signal format conversion. Accordingly, detailed explanations on FIG. 7 will be omitted.

A process for converting a luminance signal format in a horizontal direction using the foregoing device for converting a video format in a digital television receiver of the present invention will be explained in detail, with reference to FIGS. 8A and 8B. FIG. 8A illustrates a diagram showing a process for converting a luminance signal in an input video signal in a horizontal direction when an input video format and an output video format have a horizontal direction ratio of 3:8, and FIG. 8B illustrates a diagram showing a process for converting a luminance signal in an input video signal in a horizontal direction when an input video format and an output video format have a horizontal direction ratio of 2:5. That is, as shown in FIG. 8A, by repeating operations of 'a', (a+7b)/8, (a+3b)/4, (3a+5b)/8, (a+b)/2, a desired output video format can be obtained when an input video format and an output video format have a horizontal direction ratio of 3:8. And, by repeating operations of 'a', (a+4b)/5, (2a+3b)/5, a desired output video format can be obtained when an input video format and an output video format have a horizontal direction ratio of 2:5. As explained, those operations are conducted by the operand mapping unit 322, the numerator generating unit 323, and the denominator generating unit 324. All operations required for format conversions for all horizontal ratios of the input format and the output format are 'a', (a+b)/2, (a+2b)/3, (a+3b)/4, (a+5b)/6, (a+7b)/8, (3a+5b)/8, (2a+9b)/9, (a+8b)/9, (4a+5b)/9, (a+11b)/12, (5a+7b)/12, (a+14b)/15, (2a+13b)/15, (4a+11b)/15, (7a+8b)/15, (a+15b)/16, (3a+13b)/16, (5a+11b)/16, and (7a+9b)/16. The above operations are arranged considering a symmetry.

Referring to FIG. 6, upon reception of the luminance signal Y2 received presently and the luminance signal Y1 delayed through the delay 321 on the same time, the operand mapping unit 322 selects the first value 'a' and the second value 'b' for the operations cited above being the luminance signal Y1 or the luminance signal Y2 using the first multiplexer 61 and the second multiplexer 62. For example, if the required operation is (3a+5b)/8, it determines whether it is conduction of (3Y1+5Y2)/8 or (3Y2+5Y1)/8. When the first value 'a' and the second value 'b' determined thus are provided to the first shift left 63 and the second shift left 64, the first value 'a' and the second value 'b', the operands, are made of required shift lefts. As a result, a plurality of intermediate numerator operands having coefficient different from one another are obtained from the first value 'a' and the second value 'b'. Then, final operands with required coefficients are generated through the third to seventh multiplexers 65, 66, 67, 68, and 71, the operator(adder or subtracter) 69, a first adder 70, a second adder 73, and subtracter 72, and final denominator of the operation is generated. Therefore, in the case of (3a+5b)/8 operation, the first shift left 63 shift lefts the received first value 'a', to obtain the above intermediate operands. From the intermediate operands, the third multiplexer 65 selects "2a" and the fourth multiplexer 66 selects "a", both of which are provided to the operator(adder or subtracter) 69. The operator (adder or subtracter) 69 subjects the intermediate numerators '2a' and 'a' from the third multiplexer 65 and the fourth multiplexer 66, to provide a first final operand "3a". And, the second shift left 64 shift lefts the received second value "b", to obtain a plurality of intermediate numerator operands. From the intermediate numerator operands, the fifth multiplexer 67 selects the second value "b", and the sixth multiplexer 68 selects "4b", both of which are provided to the first adder 70. The first adder 70 adds the received "4b" and "b" to make "4a+b", and provides to the second adder 73 as a second final operand. In this instance, another second final operand may be calculated using the seventh multiplexer 71 and the subtracter 72. The second adder 73 adds the first final operand "3a" from the operator(adder or subtracter) 69 and the second final operand "5b" from the subtracter 72, and provides a numerator "3a+5b" of the operation equation to the denominator generating unit 324. For dividing operation, the shift right 74 in the denominator generating unit 324 shift rights the numerator "3a+5b" many times, to provide a plurality of intermediate denominator operands with coefficients different from one another. For example, to obtain "3a+5b/8", the shift right" shifts right the numerator "3a+5b" by 3 bits to divide "3a+5b" by 8. That is, by right shifting by 3 bits, a coefficient of thirds power of ½ (⅛) can be obtained. If a dividing operation can not be made only by the shifting of shift right 74, that is, in a case like 3, a first DIV 376 is used, in a case like 5, a DIV 578 is used, and in a case like 15, 15 is divided by 3 in the first DIV 376, divided by 5 in the DIV 578 again, and selectively provided through the tenth multiplexer 80. Thus, the system shown in FIG. 6 can carry out all horizontal conversion of the input video format and the output video format shown in Table 1. By simple change of a control program for the control unit 31, the shift left, and the shift right, i.e., by small addition to the adders and the subtracters, all operations, other than the format ratios of the input video format and the output video format shown in table 1, required for changing a complicated format change can be made without addition of a complicated hardware. In the meantime, the control unit 31 in FIG. 5 implements a state machine. That is, as shown in FIG. 8A, when a ratio between an input video format and an output video format is 3:8, the state transition proceeds along a path of equation (1), below.

$$a \rightarrow (3a+5b)/8 \rightarrow (a+3b)/4 \rightarrow (a+7b)/8 \rightarrow \cdots \rightarrow a \quad (1)$$

Accordingly, the control unit 31 provides control signals to the processing unit 32 so that the processing unit 32 processes respective operations. In response to the control signals, the processing unit 32 conducts respective operations. The control unit 31 can be implemented with hardware having a plurality of flip-flops and a small number of combinational logics.

Figure 9A:
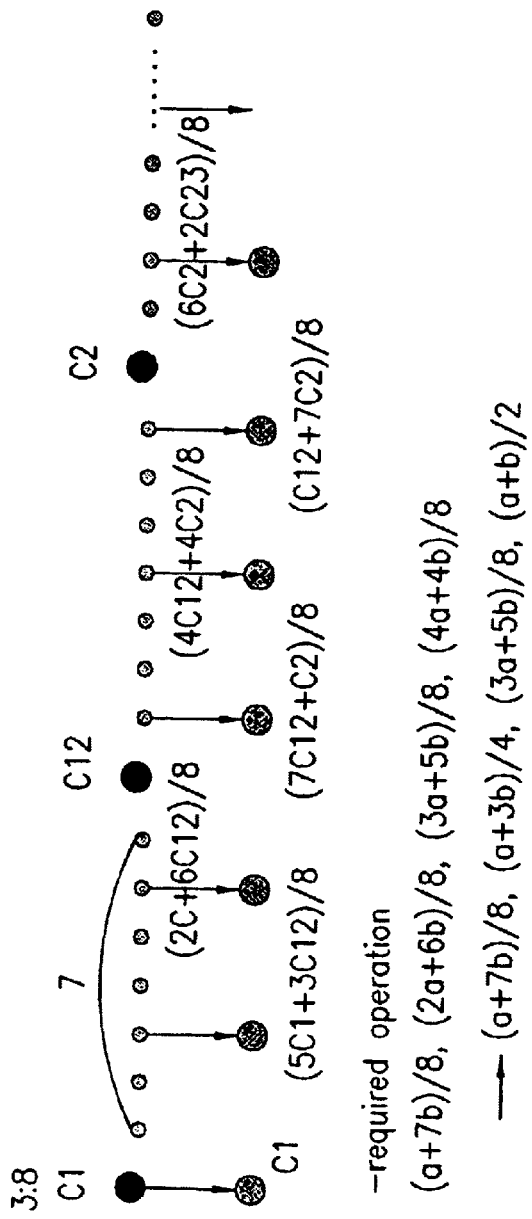
FIGS. 9A and 9B illustrate diagrams each for explaining a process for converting a chrominance signal in a horizontal direction; and, FIG. 10 illustrates a block diagram showing another system of a device for converting a video format in accordance with a preferred embodiment of the present invention.
Figure 9B:
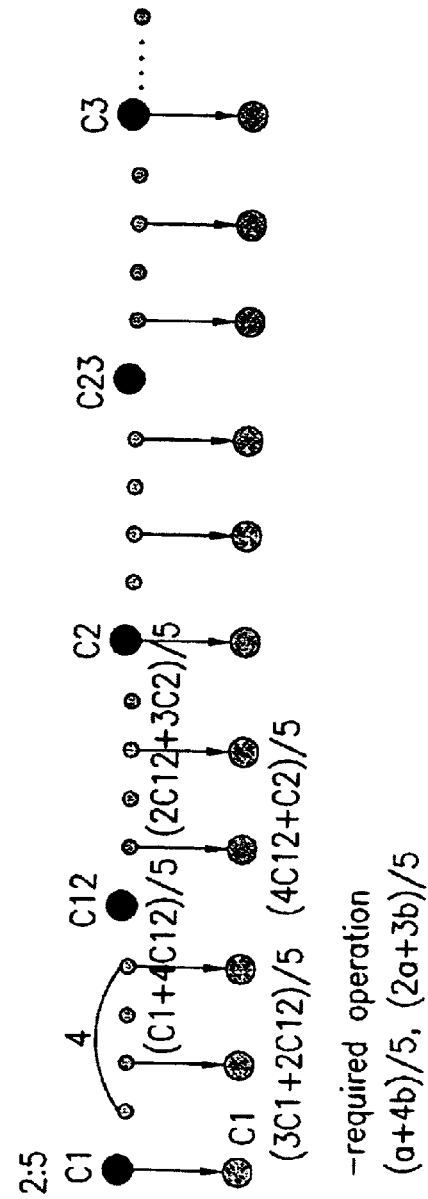

FIGS. 9A and 9B illustrate diagrams each for explaining a process for converting a chrominance signal in a horizontal direction; wherein FIG. 9A illustrates a case when a ratio of an input video format and an output video format is 3:8 and FIG. 9B illustrates a case when a ratio of an input video format and an output video format is 2:5. As the conversion processes of the formats are identical to the cases of FIGS. 8A and 8B, the detail explanations will be omitted. The explanations up to now are mostly on a horizontal format conversion of a luminance signal. In the meantime, a chrominance signal format conversion can be implemented using almost identical system and process. And, the control signals from the control unit 31 are identical to the case of the luminance signal format conversion. Referring to FIGS. 9A and 9B, one chrominance signal is provided at every two luminance signals. A new chrominance signal C12 or C23 is generated and provided from an introduction portion of the processing unit 32B to a portion to which no chrominance signal is provided. That is, as shown in FIGS. 9A and 9b, since the chrominance signal is provided in a form of 4:2:2, the chrominance signal is present half of the luminance signal. Therefore, in order to fill in spaces between the chrominance signals, intermediate chrominance signals C12, C23, - - - , are generated by the averaging unit 92. The received chrominance signals Cn-1, Cn and the newly generated intermediate chrominance signal are selected by the first multiplexer 93 and the second multiplexer 94 under the control of the control unit 31. Accordingly, the chrominance signals have a ratio of 4:4:4. Therefore, as shown in FIG. 3C, the control unit 31 can be shared with the first processing unit 32A which makes a luminance signal format conversion. And, the second processing unit 32B for making a chrominance signal format conversion may have a system identical to the first processing unit 32A.

FIG. 10 illustrates a block diagram showing another system of a device for converting a video format in accordance with a preferred embodiment of the present invention. The device in FIG. 10 is identical to the device shown in FIG. 3A except for a ratio detecting unit 800. The ratio detecting unit 800 detects a format conversion ratio from an input video format to an output video format. Then, the ratio detecting unit 800 provides the detected format conversion ratio to the vertical format converting unit 200 and the horizontal format converting unit 300 shown in FIG. 3A, both having the control unit 31 and the processing unit 32. Then, each of the vertical format converting unit 200 and the horizontal format converting unit 300 converts an input video format into an output video format of the nearest ratio to a format conversion ratio detected by the ratio detecting unit 800, i.e., the nearest ratio among ratios already implemented based on the Table 1.

The present invention has the following advantages.

First, the device for converting a video format of the present invention can be embodied with a small sized hardware and requires very simple modification of hardware for being adoptive to an addition of a new format.

Second, the device of the present invention facilitates a size reduction by approx. 50%, that makes a compact size available.

Third, display of a variety of modes the user requires are made easily available.

It will be apparent to those skilled in the art that various modifications and variations can be made in the device for converting a video format in a digital television receiver of the present invention without departing from the spirit or scope of the invention. Thus, it is intended that the present invention cover the modifications and variations of this invention provided they come within the scope of the appended claims and their equivalents.

What is claimed is:

1. A device for converting a video format, comprising:
   a controller determining a conversion equation to convert a video signal into a desired format based on a conversion mode, the conversion equation have a numerator portion and a denominator portion, and outputting control signals based on the determined conversion equation;
   a numerator generating unit receiving at least one of a present video signal and a previous video signal, configuring to calculate the numerator portion of the conversion equation in response to the control signals, and calculating the numerator portion using the received at least one of present and previous signals;
   a denominator generating unit receiving output of the numerator generating unit, configuring to divide the output of the numerator generating unit by the denominator portion in response to the control signals, and dividing the output of the numerator generating unit by the denominator portion to obtain output video signal of the desired format;
   an operand mapping unit receiving the present luminance signal and the previous luminance signal, and selectively supplying the present luminance signal and the previous luminance signal to components of the numerator generating unit;
   an averaging unit averaging the present chrominance signal and the previous chrominance signal to obtain and averaged chrominance signal;
   a first multiplexer selectively outputting one of the averaged chrominance signal and the present chrominance signal;
   a second multiplexer selectively outputting one of the averaged chrominance signal and the previous chrominance signal; and
   an operand mapping unit receiving output from the first and second multiplexers, and selectively supplying the output from the first and second multiplexers to components of the denominator generating unit.

2. A device as claimed in claim 1, wherein the operand mapping unit comprises;
   a first multiplexer for providing one of the present luminance signal and the previous luminance signal as a first value 'a' to the numerator generating unit, and
   a second multiplexer for providing one of the present luminance signal and the previous luminance signal as a second value 'b' to the numerator generating unit.

3. A device as claimed in claim 2, wherein the numerator generating unit comprises:
   a first shift left for shifting the first value 'a' from the first multiplexer to a left direction by units of an (n)th power of $2(2^n, n=0, 1, 2, ---)$, to provide a plurality of values(a, 2a, 4a, 8a, - - - ) from the first value >a=, which are first intermediate operands,
   a second shift left for shifting the second value >b=from the second multiplexer to a left direction by units of an (n)th power of $2(2^n, n=0, 1, 2, ---)$ to provide a plurality of values(b, 2b, 4b, 8b, - - - ) from the second value >b=, which are second intermediate operands, and
   an operation processing unit for conducting operations required for obtaining final operands and the numerator portion in the conversion equation from the first intermediate operands and the second intermediate operands.

4. A device as claimed in claim 3, wherein the operation processing unit comprises:
- a third multiplexer for receiving the values a, 2a, 4a, 8a from the first shift left and selecting and forwarding one of the values under the control of the controller,
- a fourth multiplexer for selectively providing either one of "a" and "0" from the first shift left under the control of the controller,
- a fifth multiplexer for selectively providing either one of values b, 2b, 4b, and 8b from the second shift left under the control of the controller,
- a sixth multiplexer for receiving the values 4b, 8b, and 16b from the second shift left and "0" and selectively providing any one of the received ones under the control of the controller,
- a seventh multiplexer for receiving the values b, 2b, and 4b from the second shift left and "0" and selectively providing any one of the received ones under the control of the controller,
- an operator for selectively subjecting a value from the third multiplexer and a value from the fourth multiplexer to a different operation,
- a first adder for adding values from the fifth multiplexer and the first multiplexer,
- a subtracter for subtracting a value from the seventh multiplexer from a value from the first adder, and
- a second adder for adding values from the operator and the subtracter, to generate a numerator portion f1 of the conversion equation.

5. A device as claimed in claim 4, wherein the operator is either an adder or a subtracter.

6. A device as claimed in claim 1, wherein the denominator generating unit comprises:
- a shift right shifting the numerator portion f1 from the numerator generating unit by units of (n)th power(n=0, 1, 2, 3, - - - ) of 2 in a right direction, to provide a plurality of values 2, ¼, ⅛, 1/16, - - - (n=0, 1, 2, 3, - - - ), and
- an operation processing unit for processing operations required for obtaining denominator portion of the conversion equation and a luminance signal having a final converted format using the plurality of values.

7. A device as claimed in claim 6, wherein the operation processing unit comprises:
- an eighth multiplexer for receiving the values f1, f½, and f¼ from the shift right and providing one of the values under the control of the controller,
- a first divider for dividing a value from the eighth multiplexer by three,
- a ninth multiplexer for selectively providing either one of a value f1 from the numerator generating unit and the value from the first divider,
- a second divider for dividing a value from the ninth multiplexer by "five",
- a third divider for dividing a value from the first divider by "three", and
- a tenth multiplexer for selectively providing one of values from the first, second, and third dividers, the present luminance signal, and a value from the shift right as a converted luminance signal under the control of the controller.

8. A device as claimed in claim 1, wherein the operand mapping unit comprises:
- a third multiplexer for providing one of the present luminance signal and the previous luminance signal as a first initial operand value 'a' to the numerator generating unit, and
- a fourth multiplexer for providing one of the present luminance signal and the previous luminance signal as a second initial operand value 'b' to the numerator generating unit.

9. A device as claimed in claim 8, wherein the numerator generating unit comprises:
- a first shift left for shifting the value >a= from the third multiplexer to a left direction by units of an (n)th power of 2($2^n$, n=0, 1, 2, - - - ), to provide a plurality of values(a, 2a, 4a, 8a, - - - ) from the value >a=, which are first intermediate operands,
- a second shift left for shifting the value >b= from the fourth multiplexer to a left direction by units of an (n)th power of 2($2^n$, n=0, 1, 2, - - - ), to provide a plurality of values(b, 2b, 4b, 8b, - - - ) from the value >b=, which are second intermediate operands, and
- an operation processing unit for conducting operations required for obtaining final operands and the numerator portion in the conversion equation from the first intermediate operands and the second intermediate operands.

10. A device as claimed in claim 9, wherein the operation processing unit comprises:
- a third multiplexer for receiving the values a, 2a, 4a, 8a from the first shift left and selecting and forwarding one of the values under the control of the controller,
- a fourth multiplexer for selectively providing either one of "a" and "0" from the first shift left under the control of the controller,
- a fifth multiplexer for selectively providing either one of values b, 2b, 4b, and 8b from the second shift left under the control of the controller,
- a sixth multiplexer for receiving the values 4b, 8b, and 16b from the second shift left and A0" and selectively providing any one of the received ones under the control of the controller,
- a seventh multiplexer for receiving the values b, 2b, and 4b from the second shift left and "0" and selectively providing any one of the received ones under the control of the controller,
- an operator for selectively subjecting a value from the third multiplexer and a value from the fourth multiplexer to a different operation,
- a first adder for adding values from the fifth multiplexer and the first multiplexer,
- a subtracter for subtracting a value from the seventh multiplexer from a value from the first adder, and
- a second adder for adding values from the operator and the subtracter, to generate a numerator portion f1 of the conversion equation.

11. A device as claimed in claim 10, wherein the operator is either an adder or a subtracter.

12. A device as claimed in claim 1, wherein the denominator generating unit comprises:
- a shift right shifting the numerator portion f1 from the numerator generating unit by units of (n)th power(n=0, 1, 2, 3, - - - ) of 2 in a right direction, to provide a plurality of values 2, ¼, ⅛, 1/16, - - - (n=0, 1, 2, 3, - - - ), and
- an operation processing unit for processing operations required for obtaining denominator portion of the conversion [operation] equation and a luminance signal having a final converted format using the plurality of values.

13. A device as claimed in claim 12, wherein the operation processing unit comprises:

an eighth multiplexer for receiving the values f1, f½, and f¼ from the shift right and providing one of the values under the control of the controller, a first divider for dividing a value from the eighth multiplexer by three, a ninth multiplexer for selectively providing either one of a value f1 from the numerator generating unit and the value from the first divider, a second divider for dividing a value from the ninth multiplexer by "five", a third divider for dividing a value from the first divider by "three", and a tenth multiplexer for selectively providing one of values from the first, second, and third dividers, a present chrominance signal, and a value from the shift right as a converted chrominance signal under the control of the controller.

14. The device as claimed in claim 1, wherein the present and previous video signals are luminance signals.

15. The device as claimed in claim 1, wherein the present and previous video signals are chrominance signals.

16. A digital television receiver, comprising:

an antenna;

a tuner for synchronizing to a desired channel signal;

an intermediate frequency signal generating unit for generating an intermediate frequency signal of the synchronized channel signal;

an audio signal processing unit for processing an audio signal in the intermediate frequency signal so that the audio signal is audible;

a video signal processing unit for processing a video signal in the intermediate frequency signal for obtaining chrominance signals and a luminance signal;

a filter unit for low pass filtering the video signal from the video signal processing unit;

a vertical format converting unit for converting a video signal format from the filter unit in a vertical direction to match to a desired output signal format; and, a horizontal format converting unit for converting a video signal format from the vertical format converting unit in a horizontal direction to match to a desired output video signal format, wherein each of the vertical format converting unit and the horizontal format converting unit includes;

a control unit for determining an operation conducted at the present time, recognizing an operation to be conducted at the next time based on the operation conducted at the present time, and providing control signals suitable for the operation to be conducted at the next time, according to an input video format of an input video signal and an output video format of an output video signal desired to provide, a first processing unit for converting a luminance signal format in the input video signal into a desired output video format, a second processing unit for converting a chrominance signal format in the input video signal into a desired output video format, and a separating unit for separating the received video signal into chrominance signals and a luminance signal.

17. A device as claimed in claim 16, wherein the first processing unit includes;

a delay for delaying a received luminance signal, an operand mapping unit for utilizing the delayed luminance signal from the delay and a luminance signal received presently in determining initial operands to be used in a conversion operation equation, i.e., a first value 'a' and a second value 'b', according to a format conversion ratio, a numerator generating unit for generating a numerator in the conversion operation equation using the operands of the conversion operation equation from the operand mapping unit, and a denominator generating unit for selecting a denominator of the conversion operation equation, dividing the numerator of the conversion operation equation from the numerator generating unit with the selected denominator, to obtain a converted luminance signal.

18. A device as claimed in claim 17, wherein the operand mapping unit includes;

a first multiplexer for providing a first value 'a', an initial operand, of the conversion operation equation according to a format conversion using the delayed luminance signal Y1 from the delay and a luminance signal Y2 received presently, and a second multiplexer for providing a second value 'b', an initial operand, of the conversion operation equation according to a format conversion using the delayed luminance signal Y1 from the delay and a luminance signal Y2 received presently.

19. A device as claimed in claim 17, wherein the numerator generating unit includes;

a first shift left for shifting the first value 'a' from the first multiplexer to a left direction by units of an (n)th power of 2 ($2^n$, n=0, 1, 2, - - - ), to provide a plurality of values(a, 2a, 4a, 8a, - - - ) from the first value 'a', which are first intermediate operands, a second shift left for shifting the second value 'b' from the second multiplexer to a left direction by units of an (n)th power of 2 ($2^n$, n=0, 1, 2, - - - ), to provide a plurality of values(b, 2b, 4b, 8b, - - - ) from the second value 'b', which are second intermediate operands, and an operation processing unit for conducting operations required for obtaining the final operands and the numerators in the conversion operation equation from the first intermediate operands and the second intermediate operands.

20. A device as claimed in claim 17, wherein the denominator generating unit shifts the numerator f1 from the numerator generating unit by units of (n)th power (n=0, 1, 2, 3, - - - ) of 2 in a right direction, to provide a plurality of values ½, ¼, ⅛, 1/16, - - - (n=0, 1, 2, 3, - - - ), and an operation processing unit for processing operations required for obtaining denominator of the conversion operation equation and a luminance signal having a final converted format using the plurality of values.

21. A device as claimed in claim 16, wherein the second processing unit includes;

a delay for delaying a chrominance signal, an averaging unit for averaging a chrominance signal Cn-1 received presently and the chrominance signal delayed in the delay, a first multiplexer for selectively providing either one of the chrominance signal received presently and a value from the averaging unit under the control of the control unit, and a second multiplexer for selectively providing either one of the chrominance signal Cn delayed in the delay and a value from the averaging unit under the control of the control unit, an operand mapping unit for utilizing the delayed luminance signal from the delay and a luminance signal received presently in determining initial operands to be used in a conversion operation equation, i.e., a first value 'a' and a second value 'b', according to a format conversion ratio, a numerator generating unit for generating a numerator in the conversion operation equation using the operands of the conversion operation equation from the operand mapping unit, and a denominator generating unit for selecting a denominator of the conversion operation equation, dividing the numerator of the conversion operation equation from the numerator generating unit with the selected denominator, to obtain a converted luminance signal.

22. A device as claimed in claim 16, further comprising a ratio detecting unit for detecting a format conversion ratio from an input video format to an output video format and providing the detected format conversion ratio to the vertical format converting unit and the horizontal format converting unit.

23. A device for converting a video format, comprising
a control unit determining an operation to convert an input video signal into a video signal of desired format, the determined operation including at least one of a multiplication operation and a division operation; and a processing unit performing the determined operation based on control signals from the control unit, the processing unit performing the at least one of the multiplication operation and the division operation by shifting in a shifter a value to be one of multiplied and divided.

24. A device for converting a video format, comprising:

a controller determining a conversion equation to convert a video signal into a desired format based on a conversion mode, the conversion equation have a numerator portion and a denominator portion, and outputting control signals based on the determined conversion equation;

a numerator generating unit receiving at least one of a present video signal and a previous video signal, configuring to calculate the numerator portion of the conversion equation in response to the control signals, and calculating the numerator portion using the received at least one of present and previous signals; and a denominator generating unit receiving output of the numerator generating unit, configuring to divide the output of the numerator generating unit by the denominator portion in response to the control signals, and dividing the output of the numerator generating unit by the denominator portion to obtain output video signal of the desired format, wherein the denominator generating unit comprises:
a shift right shifting the numerator portion f1 from the numerator generating unit by units of (n)th power (n=0, 1, 2, 3, - - - ) of 2 in a right direction, to provide a plurality of values 2, ¼, ⅛, 1/16, - - - (n=0, 1, 2, 3, - - - ), and an operation processing unit for processing operations required for obtaining denominator portion of the conversion equation and a luminance signal having a final converted format using the plurality of values.

* * * * *